US011858261B2

(12) United States Patent
Shibata et al.

(10) Patent No.: US 11,858,261 B2
(45) Date of Patent: Jan. 2, 2024

(54) RECORDING APPARATUS AND TRANSPORT DEVICE

(71) Applicant: SEIKO EPSON CORPORATION, Tokyo (JP)

(72) Inventors: Yohei Shibata, Shiojiri (JP); Satoshi Fujioka, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 11 days.

(21) Appl. No.: 17/809,229

(22) Filed: Jun. 27, 2022

(65) Prior Publication Data

US 2022/0410601 A1 Dec. 29, 2022

(30) Foreign Application Priority Data

Jun. 28, 2021 (JP) ................................ 2021-106443

(51) Int. Cl.

| | |
|---|---|
| ***B41J 15/16*** | (2006.01) |
| ***B41J 5/16*** | (2006.01) |
| *B65H 23/16* | (2006.01) |
| *B65H 23/195* | (2006.01) |
| *B65H 23/04* | (2006.01) |

(52) U.S. Cl.

CPC ............... *B41J 5/16* (2013.01); *B41J 15/165* (2013.01); *B65H 23/048* (2013.01); *B65H 23/16* (2013.01); *B65H 23/195* (2013.01); *B65H 23/1955* (2013.01); *B65H 2408/217* (2013.01)

(58) Field of Classification Search

CPC ....... B41J 15/16; B41J 15/165; B65H 23/048; B65H 23/16; B65H 23/195; B65H 23/1955; B65H 2408/217

See application file for complete search history.

(56) References Cited

U.S. PATENT DOCUMENTS

| | | | | |
|---|---|---|---|---|
| 2007/0079713 A1* | 4/2007 | Koeda | B65H 23/1955 | 101/228 |
| 2008/0253823 A1* | 10/2008 | Kanbara | B41J 15/165 | 400/642 |
| 2015/0054895 A1* | 2/2015 | Suzuki | B41J 15/16 | 242/419 |

FOREIGN PATENT DOCUMENTS

| | | |
|---|---|---|
| JP | 2018-012599 | 1/2018 |

* cited by examiner

*Primary Examiner* — Henok D Legesse

(74) *Attorney, Agent, or Firm* — WORKMAN NYDEGGER

(57) ABSTRACT

A recording apparatus capable of recording on a medium includes a recording unit configured to record on a medium, a transport unit configured to transport the medium, a winding unit configured to rotate about a rotation axis and windup the medium transported by the transport unit, and a first bar member configured to be wrapped around by a first surface of the medium, a second bar member disposed between the first bar member and the winding unit and configured to be wrapped around by a second surface of the medium, and an arm member swingable about a swing axis that coincides with the rotation axis, wherein the arm member supports the first bar member and the second bar member.

5 Claims, 10 Drawing Sheets

RECORDING APPARATUS AND TRANSPORT DEVICE

The present application is based on, and claims priority from JP Application Serial Number 2021-106443, filed Jun. 28, 2021, the disclosure of which is hereby incorporated by reference herein in its entirety.

BACKGROUND

1. Technical Field

The present disclosure relates to a recording apparatus and a transport device.

2. Related Art

There is known a printer in which a recording medium is wound around a winding shaft after printing. The printer in JP-a-2018-12599 includes a platen on which recording paper is placed during printing, a recording head that ejects ink, and a winding device that winds up the recording paper into a roll. The printer also includes a tension bar. The tension bar is supported by a support arm. The support arm pivots about a support shaft and pivots about the support shaft, which coincides with the winding shaft of the winding device.

However, when the tension bar swings, the posture of the recording paper between the roll paper wound by the winding device and the tension bar changes, and the change in tension applied to the recording paper may become large.

SUMMARY

A recording apparatus of the present disclosure includes a recording unit configured to record on a medium, a transport unit configured to transport the medium, a winding unit configured to rotate about a rotation axis and windup the medium transported by the transport unit, and a first bar member configured to be wrapped around by a first surface of the medium, a second bar member disposed between the first bar member and the winding unit and configured to be wrapped around by a second surface of the medium, and an arm member swingable about a swing axis that coincides with the rotation axis, wherein the arm member supports the first bar member and the second bar member.

A transport device according to the present disclosure is a transport device capable of transporting a medium, the transport device including a transport unit configured to transport a medium, a winding unit configured to rotate about a rotation axis and wind up the medium transported by the transport unit, a first bar member configured to be wrapped around by a first surface of the medium, a second bar member disposed between the first bar member and the winding unit and configured to be wrapped around by a second surface of the medium, and an arm member that supports the first bar member and the second bar member and that is swingable about a swing axis that coincides with the rotation axis, wherein the arm member supports the first bar member and the second bar member.

DESCRIPTION OF EMBODIMENTS

Figure 1:
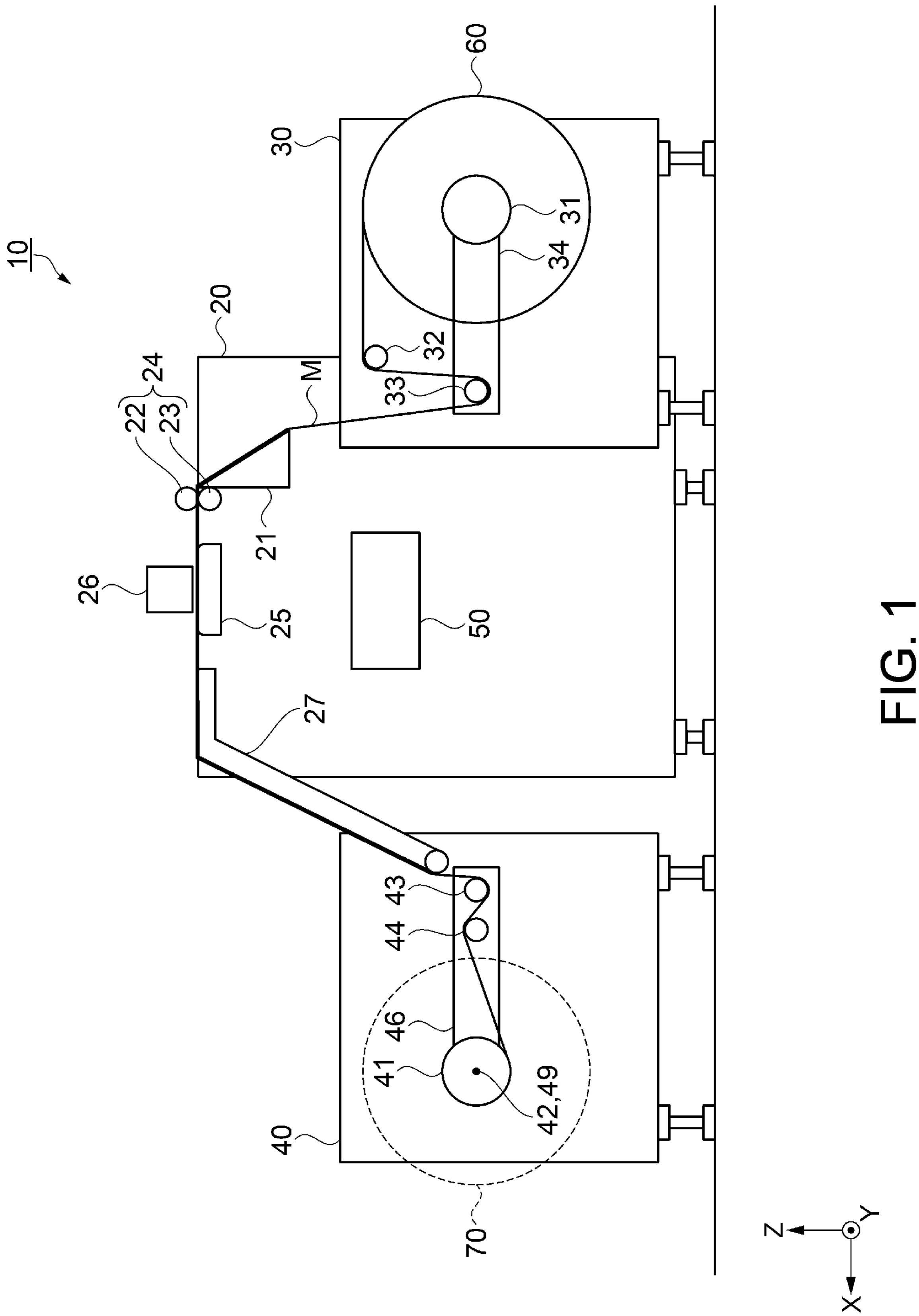
FIG. 1 is a schematic cross-sectional view showing configuration of a printer.

FIG. 1 is a schematic cross-sectional view showing configuration of a printer 10. The printer 10 is an ink jet printer that performs printing by ejecting ink onto a medium M. The printer 10 includes a printing unit 20, a supply unit 30 that feeds out the medium M, and a medium winding unit 40. The printer 10 corresponds to an example of a recording apparatus. The medium M corresponds to an example of a medium.

Some drawings including FIG. 1 show an XYZ coordinate system. The X axis, the Y axis, and the Z axis are orthogonal to each other. The X-axis is parallel to the installation surface of the printer 10 and corresponds to the width of the printer 10. The Y axis is parallel to the installation surface of the printer 10, and corresponds to the depth of the printer 10. The Z axis is perpendicular to the installation surface of the printer 10, and corresponds to the height of the printer 10.

Hereinafter, the +X direction, which is parallel to the X axis, indicates a direction from the supply unit 30 toward the medium winding unit 40, and indicates a direction from the center toward the left in FIG. 1. The −X direction of the X axis indicates a direction from the center to the right in FIG. 1. The +Y direction, which is parallel to the Y axis, indicates a direction toward the front of FIG. 1. The −Y direction, which is parallel to the Y axis, indicates a direction toward the back of FIG. 1. The +Z direction, which is parallel to the Z axis, indicates a direction directed upward from the center of FIG. 1. The −Z direction, which is parallel to the Z axis, indicates a direction downward from the center of FIG. 1.

The printing unit 20 includes a supply guide frame 21, a transport roller pair 24 including a first transport roller 22 and a second transport roller 23, a platen 25, a print head 26, a discharge guide frame 27, and a control unit 50.

The supply guide frame 21 guides the medium M that was fed out from the supply unit 30 to the transport roller pair 24. The supply guide frame 21 guides the medium M in the +X direction and the +Z direction. The supply guide frame 21 may be constituted by one member or may be constituted by a plurality of members.

The transport roller pair 24 includes a first transport roller 22 and a second transport roller 23, and is capable of transporting the medium M. The transport roller pair 24 corresponds to an example of a transport unit. The first transport roller 22 is disposed at a position in the +Z direction with respect to the medium M. The second transport roller 23 is disposed at a position in the −Z direction with respect to the medium M. The first transport roller 22 or the second transport roller 23 is rotationally driven by a driving force from a driving source such as a motor (not shown). The first transport roller 22 and the second transport roller 23 transport the medium M to the print head 26 by the driving force from the driving source, in a state of sandwiching the medium M by pressing against each other.

The platen 25 is provided at a position in the −Z direction with respect to the print head 26. The platen 25 is a flat plate-shaped member that supports the medium M transported by the transport roller pair 24. In a case where a suction fan is provided at a position in the −Z direction with respect to the platen 25, a through hole through which an air current flows is provided in the platen 25. The medium M is pressed against the platen 25 by the air flow of the suction fan.

The print head 26 can perform printing by ejecting ink onto the medium M supported by the platen 25. The print head 26 forms an image on the medium M by ejecting ink. The print head 26 corresponds to an example of a recording unit. The print head 26 may be supported by a carriage (not shown) and moved in the +Y direction and the −Y direction.

The discharge guide frame 27 guides the medium M printed on by the print head 26, to the medium winding unit 40. The discharge guide frame 27 guides the medium M in an oblique direction intersecting the +X direction and the −Z direction. The discharge guide frame 27 may be formed of one member or may be formed of a plurality of members.

A drying unit (not shown) may be provided at a position facing the discharge guide frame 27. The drying unit includes, for example, a heater as a heating source. The drying unit heats the medium M on the discharge guide frame 27 and promotes fixing of the ejected ink to the medium M.

The control unit 50 is a controller that performs various types of control such as transport control of the medium M and print control on the medium M. The controller includes a central processing unit (CPU), read only memory (ROM), random access memory (RAN), and storage, none of which are shown. The control unit 50 acquires detection results from various sensors (not shown) and performs various controls. The control unit 50 may acquire print data and perform various controls based on the acquired print data. The control unit 50 may be composed of one or more units.

The supply unit 30 includes a medium roll support shaft 31, a supply guide member 32, a supply bar member 33, and supply bar support members 34. A medium roll 60 of the medium M wound in a roll shape is supplied to the supply unit 30.

The medium roll support shaft 31 supports the medium roll 60. The medium roll support shaft 31 is rotatably supported by a frame or the like (not shown) disposed at an end portion in the +Y direction and an end portion in the −Y direction of the supply unit 30. The medium roll support shaft 31 may be rotated by driving force of a driving source such as a motor (not shown). When the medium roll support shaft 31 is rotated by the driving force of the driving source, the rotation amount is controlled by the control of the control unit 50.

The supply guide member 32 guides the medium M fed out from the medium roll 60. The supply guide member 32 guides the medium M in an oblique direction intersecting the +X direction and the −Z direction. The supply guide member 32 is, for example, a roll member. The roll member may be supported so as to be rotatable or may be non-rotatably supported. In order to increase the slidability of the medium M, it is desirable that the roll member is rotatably supported.

The supply bar member 33 is supported by the supply bar support members 34. The supply bar member 33 is wrapped around by the medium M guided by the supply guide member 32 and applies tension to the medium M. The supply bar member 33 guides the medium M to the transport roller pair 24 via the supply guide frame 21. The supply bar member 33 guides the medium M substantially in the +Z direction.

The supply bar support members 34 are disposed at a position in the +Y direction and at a position in the −Y direction with respect to the supply bar member 33, so as to sandwich the supply bar member 33. The supply bar support members 34 swingably support the supply bar member 33. The supply bar support members 34 swing the supply bar member 33 about a virtual supply bar swing axis (not shown). In the case of FIG. 1, the supply bar swing axis coincides with the rotation axis (not shown) of the medium roll support shaft 31. The supply bar swing axis may not coincide with the rotation axis. The supply bar support members 34 apply tension to the medium M by swinging the supply bar member 33. The supply bar support members 34 adjust the tension acting on the portion of the medium M from the medium roll 60 to the transport roller pair 24 by applying tension to the medium M.

The medium winding unit 40 includes a medium winding member 41, a first tension bar 43, a second tension bar 44, and a tension bar support member 46. The medium winding unit 40 winds the medium M which was printed on by the printing unit 20.

FIG. 1 shows a winding member rotation axis 42, which is the rotation center of the medium winding member 41, and a tension bar swing axis 49, which is the swing center of the tension bar support member 46. The winding member rotation axis 42 and the tension bar swing axis 49 are virtual shafts and are parallel or substantially parallel to the Y axis. The winding member rotation axis 42 and the tension bar swing axis 49 may deviate within the range of design error. The winding member rotation axis 42 corresponds to an example of a rotation axis. The tension bar swing axis 49 corresponds to an example of a swing axis.

The medium winding member 41 is capable of winding up the printed medium M. The medium winding member 41 is provided downstream of the transport roller pair 24 in the transport direction of the medium M. The medium winding member 41 is rotatable about the winding member rotation axis 42. The medium winding member 41 supports the printing medium roll 70 on which the medium M printed by the printing unit 20 is wound. The print medium roll 70 of FIG. 1 shows a virtual state of the medium M being wound up. The medium winding member 41 is rotatably supported by a frame or the like (not shown) disposed at an end portion in the +Y direction and at an end portion in the −Y direction of the medium winding unit 40. The medium winding member 41 is rotated by a driving force from a driving source such as a motor (not shown), and winds up the medium M. The medium winding member 41 corresponds to an example of a winding unit.

Of the medium M, the printing surface printed by the print head 26 wraps around the first tension bar 43. The printing surface corresponds to an example of a first surface. The first tension bar 43 is in contact with the printing surface directly or via a cover member 161 described later. That is, the first tension bar 43 can directly or indirectly contact the printing surface. The printing surface of the medium M wraps directly or indirectly around the first tension bar 43. The first tension bar 43 presses the printing surface of the medium M by its own weight. The first tension bar 43 may press against the printing surface of the medium M using the rotation of the medium winding member 41 as a driving force. The first tension bar 43 may be pressed against the printing surface of the medium M by swinging of the tension bar support member 46. The first tension bar 43 may have any shape as long as it can be pressed against the printing surface of the medium M, but the shape thereof is preferably a cylinder or a column extending in the direction along the X axis. As the first tension bar 43, an extrusion-molded member of a metal material such as aluminum or steel use stainless (SUS), or a pipe-processed member of a metal material such as aluminum or SUS is used. The first tension bar 43 corresponds to an example of a first bar member.

A rear surface of the medium M, which is the opposite surface from the printing surface, wraps around the second tension bar 44. The rear surface corresponds to an example of a second surface. The second tension bar 44 is in contact with the rear surface directly or via the cover member 161. That is, the second tension bar 44 can directly or indirectly contact the rear surface. Further, the rear surface of the medium M directly or indirectly wraps around the second tension bar 44. The second tension bar 44 may have any shape as long as the rear surface of the medium M can wrap around the second tension bar 44, but the shape is preferably a cylinder or a column extending in the direction along the X axis. As the second tension bar 44, an extrusion-molded member of a metal material such as aluminum or SUS, or a pipe-processed member of a metal material such as aluminum or SUS is used. The second tension bar 44 corresponds to an example of a second bar member.

The tension bar support member 46 is supported by a frame or the like disposed at a position in the +Y direction and at a position in the −Y direction of the medium winding unit 40. The tension bar support member 46 supports the first tension bar 43 and the second tension bar 44. The tension bar support member 46 is swingable about the tension bar swing axis 49. The tension bar support member 46 supports the first tension bar 43 and the second tension bar 44 such that the second tension bar 44 is positioned between the tension bar swing axis 49 and the first tension bar 43. The cross-sectional shape of the tension bar support member 46 in FIG. 1 is, when viewed from the +Y direction, a rectangle elongated in an axis parallel to the X axis, but is not limited to this. The cross-sectional shape of the tension bar support member 46 in FIG. 1 may be a shape, when viewed from the +Y direction, having a portion extending in the +Z direction or in the −Z direction from the tension bar swing axis 49 and a portion extending in the −X direction from the +Z direction or −Z direction end of the first portion. That is, the cross-sectional shape of the tension bar support member 46 in FIG. 1 may be a shape, when viewed from the +Y direction, having a first portion extending in a first direction from the tension bar swing axis 49 and a second portion extending in a second direction, different from the first direction, from the first portion, which is in the first direction. The tension bar support member 46 corresponds to an example of an arm member. The first tension bar 43, the second tension bar 44, and the tension bar support member 46 correspond to an example of a tension applying unit that applies tension to the medium M. The tension bar support member 46 may be constituted by two units supported by a frame disposed at a position in the +Y direction and a position in the −Y direction of the medium winding unit 40.

A sensor (not shown) is provided with respect to the tension bar support member 46 for detecting a swing position. The tension bar support member 46 swings in the −Z direction by the weight of the first tension bar 43 and the second tension bar 44, and applies tension to the medium M. When the tension bar support member 46 swings to a predetermined lower limit position in the −Z direction, the control unit 50 controls the drive source that rotates the medium winding member 41, and causes the medium winding member 41 to wind the medium M. When the medium M is wound around the medium winding member 41, the tension bar support member 46 swings in the +Z direction. When the tension bar support member 46 swings to a predetermined upper limit position in the +Z direction, the control unit 50 controls the drive source that rotates the medium winding member 41 and stops the winding of the medium M onto the medium winding member 41. The control unit 50 adjusts the degree to which tension is applied to the medium M by the driving operation of the tension bar support member 46.

The printer 10 transports the medium M fed out from the medium roll 60 supplied to the supply unit 30 through the following path. The medium M unwound from the medium roll 60 is transported to the printing unit 20 via the supply guide member 32 and the supply bar member 33. The printing unit 20 transports the medium M to the medium winding unit 40 using the supply guide frame 21, the transport roller pair 24, the platen 25, and the discharge guide frame 27. The medium winding unit 40 winds the medium M that has passed by the first tension bar 43 and the second tension bar 44 around the printing medium roll 70 supported on the medium winding member 41. A device including the transport roller pair 24, the first tension bar 43, the second tension bar 44, the tension bar support member 46, and the medium winding member 41 corresponds to an example of a transport device.

Figure 2A:
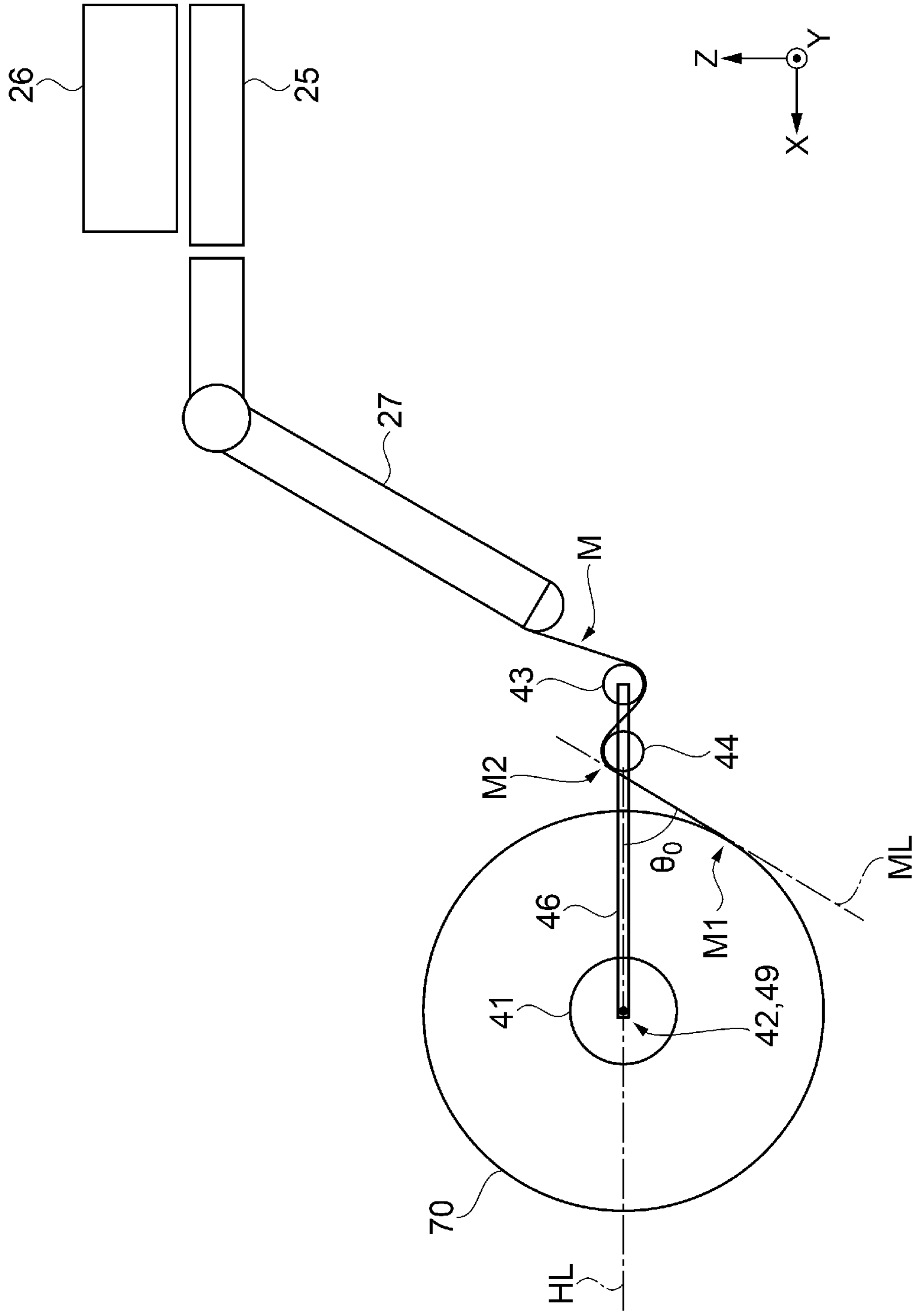
FIG. 2A is a diagram showing a case where a tension bar support member is positioned at a swing center.
Figure 2B:
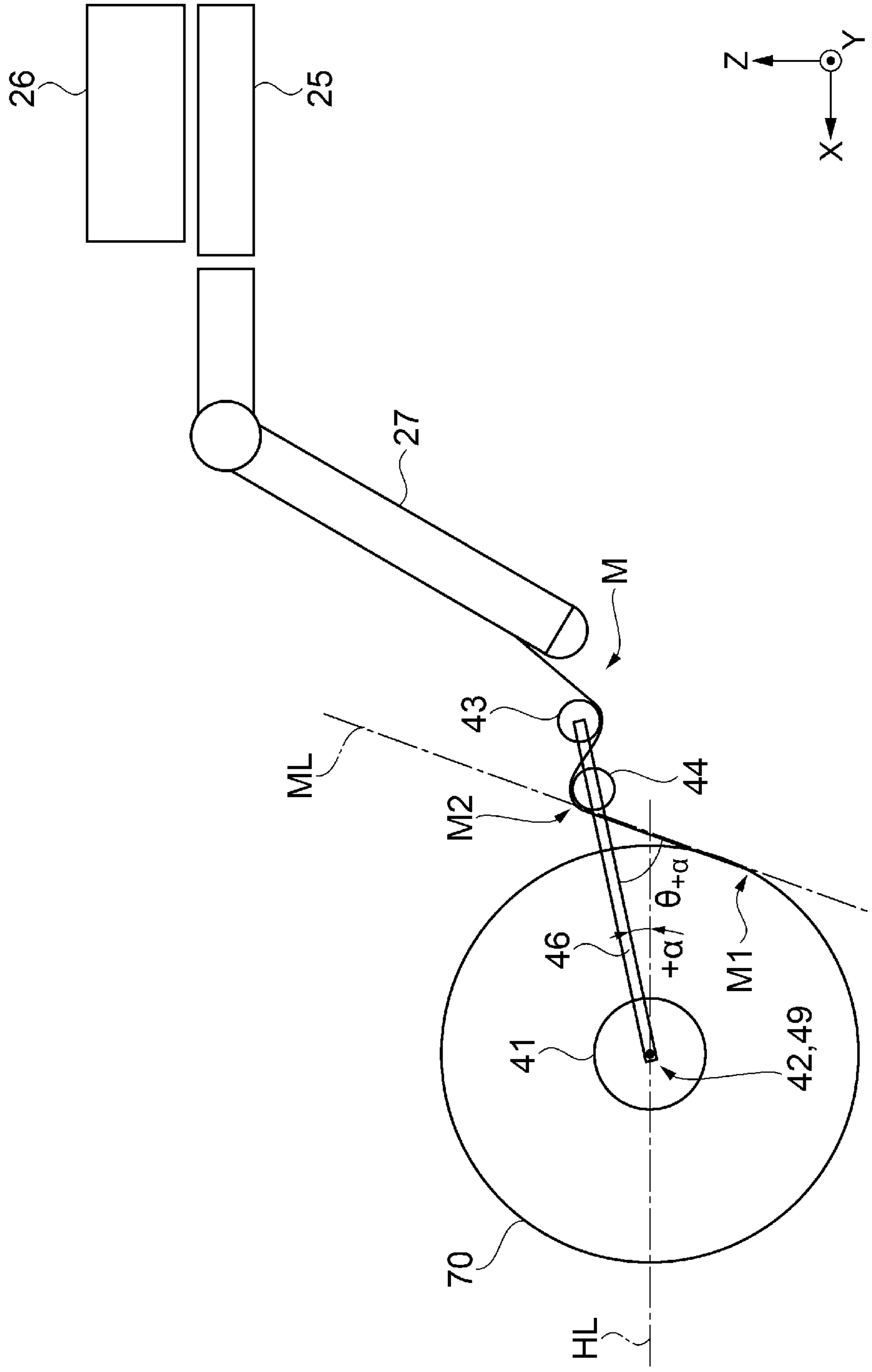
FIG. 2B is a diagram showing a case where the tension bar support member swings in a +Z direction.
Figure 2C:
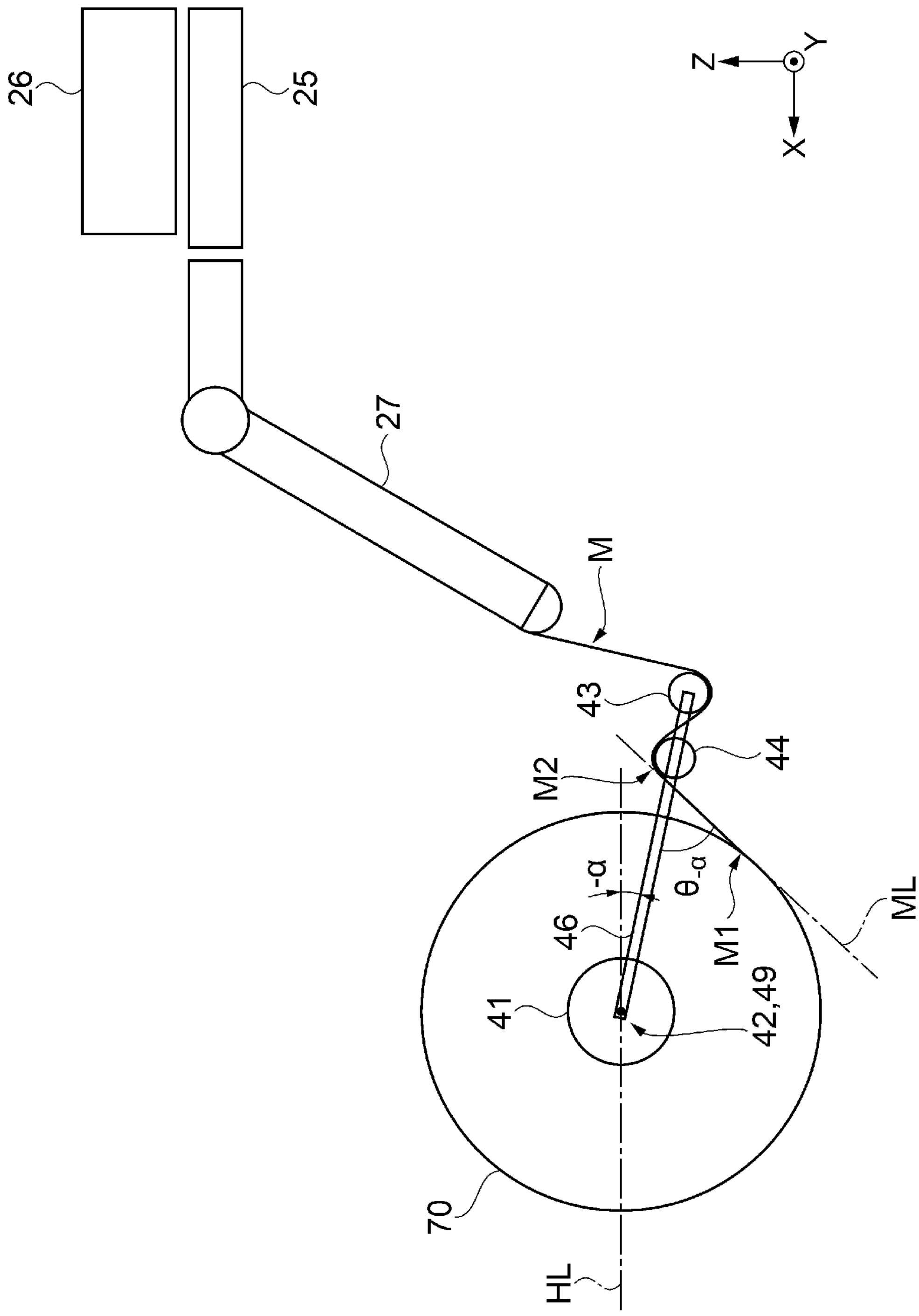
FIG. 2C is a diagram showing a case where the tension bar support member swings in a −Z direction.

FIGS. 2A, 2B, and 2C illustrate the operation of the tension bar support member 46. FIG. 2A shows a case where the tension bar support member 46 is positioned at the swing center. The swing center is a position where the longitudinal direction of the tension bar support member 46 substantially coincides with the direction in which a horizontal line HL (to be described later) extends, and is a reference for when the tension bar support member 46 swings in the +Z direction or the −Z direction from the center position. FIG. 2B shows a case where the tension bar support member 46 swings in the +Z direction about the tension bar swing axis 49. FIG. 2C shows a case where the tension bar support member 46 swings in the −Z direction about the tension bar swing axis 49. The tension bar support member 46 is shown in a rod shape to facilitate understanding of the operation.

FIGS. 2A, 2B, and 2C show the winding start position M1, the separation position M2, the horizontal line HL, and the medium movement line ML. The winding start position M1 is a position where the medium M transported from the second tension bar 44 is wound onto the printing medium roll 70. The separation position M2 is a position where the medium M wrapping around the second tension bar 44 separates from the second tension bar 44 in accordance with movement. The horizontal line HL is a virtual line perpendicular to the tension bar swing axis 49 and parallel to the X axis. The medium movement line ML is a virtual line connecting the winding start position M1 and the separation position M2.

FIGS. 2B and 2C show a swing angle α. The swing angle α is an angle between the horizontal line HL and the tension bar support member 46. The swing angle α indicates the angle when the tension bar support member 46 swings. The swing angle α is 0° when the tension bar support member 46 is at a horizontal position that coincides with the horizontal line HL. In FIGS. 2A, 2B, and 2C, a position where the swing angle α is 0° is set as the swing center of the tension bar support member 46. The swing center of the tension bar support member 46 is not limited to the horizontal position of the tension bar support member 46. The swing angle +α in FIG. 2B is "+" because the swinging of the tension bar support member 46 in the +Z direction is considered as a positive direction. The swing angle −α in FIG. 2C is "−" because the swinging of the tension bar support member 46 in the −Z direction is considered as the negative direction.

In FIGS. 2A, 2B, and 2C, a winding angle θ is shown. The winding angle θ is an angle between the tension bar support member 46 and the medium movement line ML. The winding angle Go shown in FIG. 2A indicates an angle between the tension bar support member 46 and the medium movement line ML when the tension bar support member 46 is positioned in the horizontal position. The winding angle $\theta_{+\alpha}$ shown in FIG. 2B indicates the angle between the tension bar support member 46 and the medium movement line ML when the tension bar support member 46 is positioned in the position of the swing angle +α. The winding angle $\theta^{-\alpha}$ shown in FIG. 2C indicates the angle between the tension bar support member 46 and the medium movement line ML when the tension bar support member 46 is positioned in the position of the swing angle −α.

As is clear from FIGS. 2A, 2B, and 2C, when the tension bar support member 46 swings, the first tension bar 43 and the second tension bar 44 move respectively in circular orbits around the tension bar swing axis 49. Since the winding member rotation axis 42 and the tension bar swinging axis 49 coincide with each other, the first tension bar 43 and the second tension bar 44 move in circular orbits concentric with the printing medium roll 70. The distance between the second tension bar 44 and the outer periphery of the print medium roll 70 is constant or substantially constant. Since the second tension bar 44 moves in a circular orbit concentric with the printing medium roll 70, there is little fluctuation of the winding angle θ due to the swing of the tension bar support member 46. That is, it holds that $\theta \approx \theta_{+\alpha} \approx \theta_{-\alpha} \approx \theta_0$. In addition, since the medium M wraps around the first tension bar 43 and the second tension bar 44, a change in the winding amount of the medium M on the first tension bar 43 and the second tension bar 44 due to the swing of the tension bar support member 46 is reduced.

As described above, the printer 10 capable of recording on the medium M includes the print head 26 capable of recording on the medium M, the transport roller pair 24 capable of transporting the medium M, the medium winding member 41 that rotates about the winding member rotation axis 42 and that can wind the medium M transported by the transport roller pair 24, the first tension bar 43 around which the printing surface of the medium M can wrap, the second tension bar 44 that is disposed between the first tension bar 43 and the medium winding member 41 and that the rear surface of the medium M can wrap around, and the tension bar support member 46 capable of swinging about the tension bar swing axis 49, which coincides with the winding member rotation axis 42. The tension bar support member 46 supports the first tension bar 43 and the second tension bar 44.

By providing the second tension bar 44 on the tension bar support member 46 that can swing coaxially with the winding member rotation axis 42 of the medium winding member 41, fluctuations in the orientation of the medium between the first tension bar 43 and the printing medium roll 70 and fluctuations in the wrapping amount of the medium on the first tension bar 43 and on the second tension bar 44 are reduced, and fluctuations in the tension on the medium M due to winding of the medium M are suppressed.

The transport device includes the transport roller pair 24 capable of transporting the medium M, the medium winding member 41 that rotates about the winding member rotation axis 42 and that can wind up the medium M transported by the transport roller pair 24, the first tension bar 43 around which the printing surface of the medium M can wrap, the second tension bar 44 that is disposed between the first tension bar 43 and the medium winding member 41 and that the rear surface of the medium M can wrap around, and the tension bar support member 46 that supports the first tension bar 43 and the second tension bar 44 and that is capable of swinging about the tension bar swing axis 49, which coincides with the winding member rotation axis 42. The tension bar support member 46 supports the first tension bar 43 and the second tension bar 44.

By providing the second tension bar 44 on the tension bar support member 46 that can swing coaxially with the winding member rotation axis 42 of the medium winding member 41, fluctuations in the orientation of the medium between the first tension bar 43 and the printing medium roll 70 and fluctuations in the wrapping amount are reduced, and fluctuations in the tension on the medium M due to winding of the medium M are suppressed.

Figure 3:
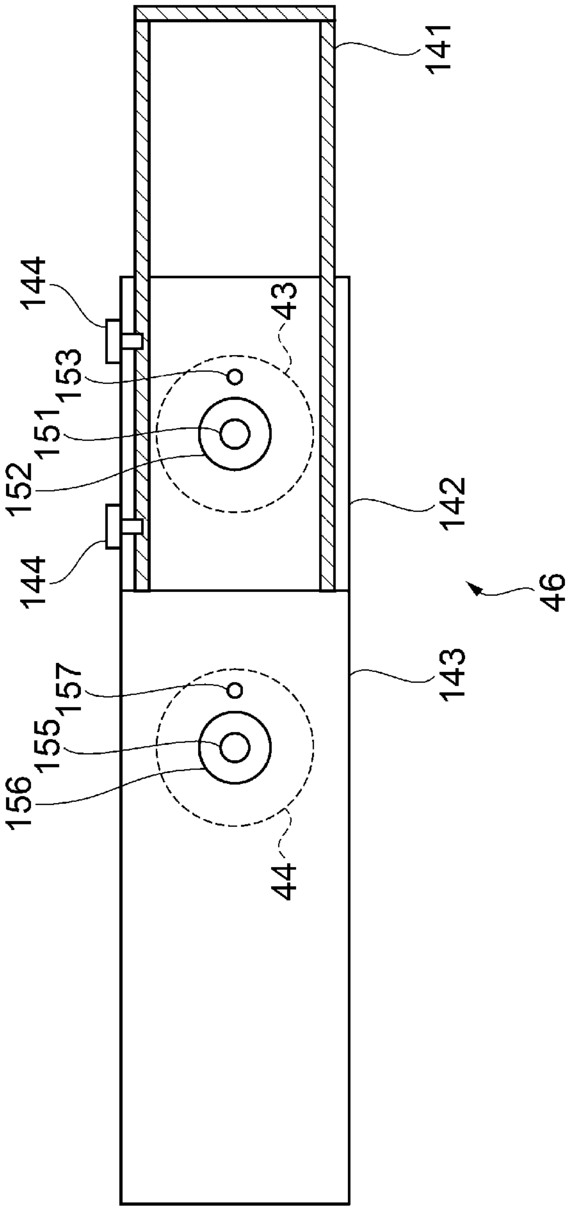
FIG. 3 is a diagram showing partial configuration of a tension bar support member.
Figure 4:
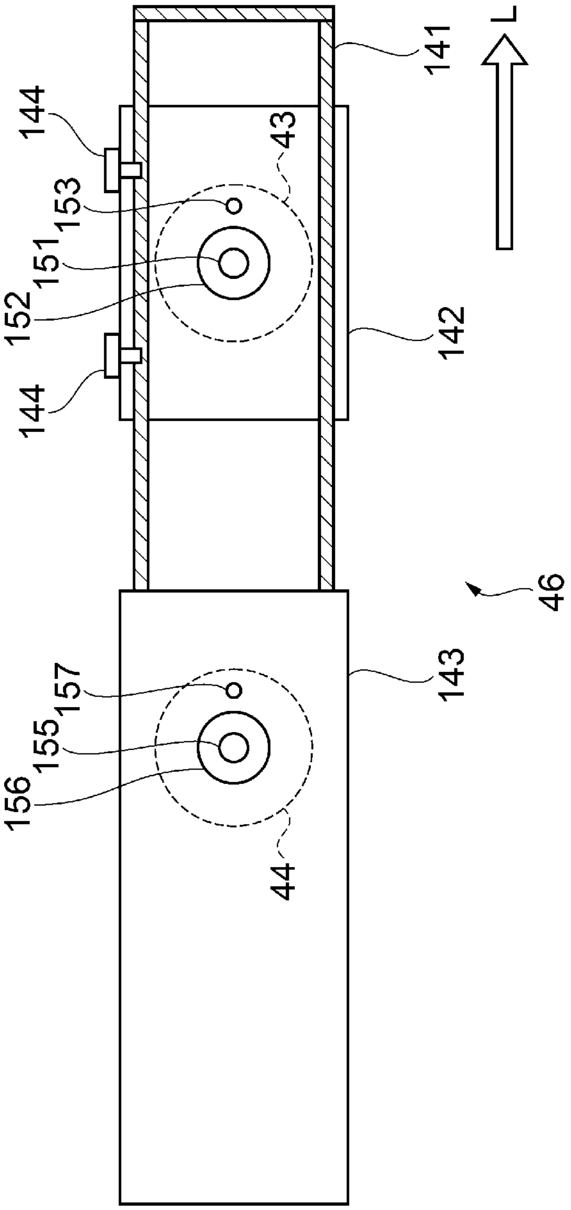
FIG. 4 is a diagram showing partial configuration of the tension bar support member.

FIGS. 3 and 4 show an example of partial configuration of the tension bar support member 46. The tension bar support member 46 in FIG. 3 shows one of the two tension bar support members 46, which are disposed in the +Y direction and in the −Y direction of the medium winding unit 40. The wo tension bar support members 46 may have the same configuration. One of the two tension bar support members 46 may not be provided with frame fixing members 144, a first rotation adjustment member 154, or a second rotation adjustment member 158, to be described later.

FIG. 3 shows a partial configuration of the tension bar support member 46 in a state where a first support frame 142 and a second support frame 143 are in contact with each other. The tension bar support member 46 shown in FIG. 3 includes a guide member 141, the first support frame 142, the second support frame 143, and the frame fixing members 144.

The guide member 141 movably supports the first support frame 142. The guide member 141 guides movement of the first support frame 142 in a direction toward the second support frame 143 or guides movement of the first support frame 142 in a direction away from the second support frame 143. FIG. 3 shows a state in which the first support frame 142 and the second support frame 143 are in contact with each other.

The first support frame 142 supports the first tension bar 43. The first support frame 142 is movable along the guide member 141 while supporting the first tension bar 43. The first tension bar 43 has a first tension bar shaft 151. The first support frame 142 supports the first tension bar shaft 151 via a first bearing 152. The first bearing 152 rotatably supports the first tension bar 43. The first support frame 142 has a first frame hole 153.

The second support frame 143 supports the second tension bar 44. The second tension bar 44 has a second tension bar shaft 155. The second support frame 143 supports the second tension bar shaft 155 via a second bearing 156. The second bearing 156 rotatably supports the second tension bar 44. The second support frame 143 has a second frame hole 157.

The frame fixing members 144 fix the position of the first support frame 142. The user of the printer 10 moves the first support frame 142 along the guide member 141 to move the first support frame 142 to a desired position. After moving the first support frame 142 to a desired position, the user fixes the first support frame 142 at the desired position using the frame fixing members 144. An example of the frame fixing members 144 is screws. The user fixes the first support frame 142 to the guide member 141 by tightening the screws. The user can make the first support frame 142 movable by loosening the screws. FIG. 3 shows a state in which the first support frame 142 is fixed by the frame fixing members 144 in a state in which the first support frame 142 is in contact with the second support frame 143. In the state of FIG. 3, the distance between the first tension bar 43 and the second tension bar 44 is minimized.

FIG. 4 shows a partial configuration of the tension bar support member 46 in a state where the first support frame 142 and the second support frame 143 are separated from each other. The tension bar support member 46 in FIG. 4 shows a state in which the first support frame 142 has slid in the separation direction L. By the first support frame 142 separating from the second support frame 143, the distance between the first tension bar 43 and the second tension bar 44 increases. By increasing the distance between the first tension bar 43 and the second tension bar 44, the user can easily perform an operation of inserting the medium M between the first tension bar 43 and the second tension bar 44 at the time of medium installation, for example. The user can adjust the distance between the first tension bar 43 and the second tension bar 44 by changing the position of the first support frame 142. The guide member 141 and the first support frame 142 correspond to an example of an interval adjustment mechanism.

As shown in FIGS. 3 and 4, the tension bar support member 46 includes the interval adjustment mechanism for changing the interval between the first tension bar 43 and the second tension bar 44.

Work is facilitated when the user performs an operation of winding the medium M around the first tension bar 43 and the second tension bar 44.

Figure 5:
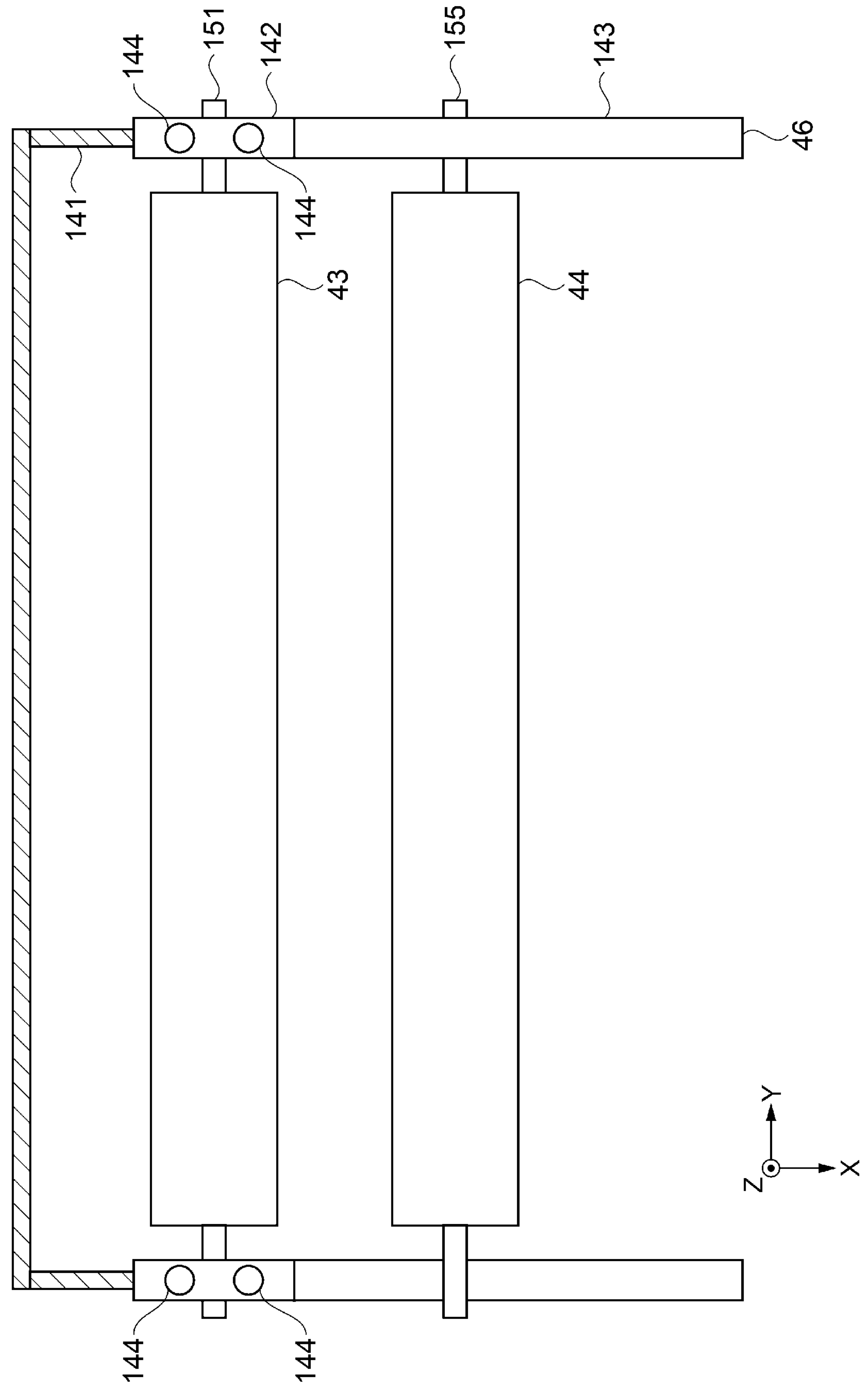
FIG. 5 is a diagram showing support configuration of a first tension bar and a second tension bar.

FIG. 5 shows support configuration of the first tension bar 43 and the second tension bar 44 by the tension bar support member 46. FIG. 5 shows an example of a tension applying unit. FIG. 5 is a schematic view of the tension applying unit viewed from the +Z direction. Two tension bar supporting members 46 support the first tension bar 43 and the second tension bar 44. The first tension bar 43 is rotatably supported by the first bearing 152 shown in FIG. 3. The first tension bar 43 rotates when the medium M is transported. The second tension bar 44 is rotatably supported by the second bearing 156 shown in FIG. 3. The second tension bar 44 rotates when the medium M is transported. Each of the two first support frames 142 shown in FIG. 5 includes two frame fixing members 144, but are not limited to this. The frame fixing members 144 may be one, or may be three or more.

Figure 6:
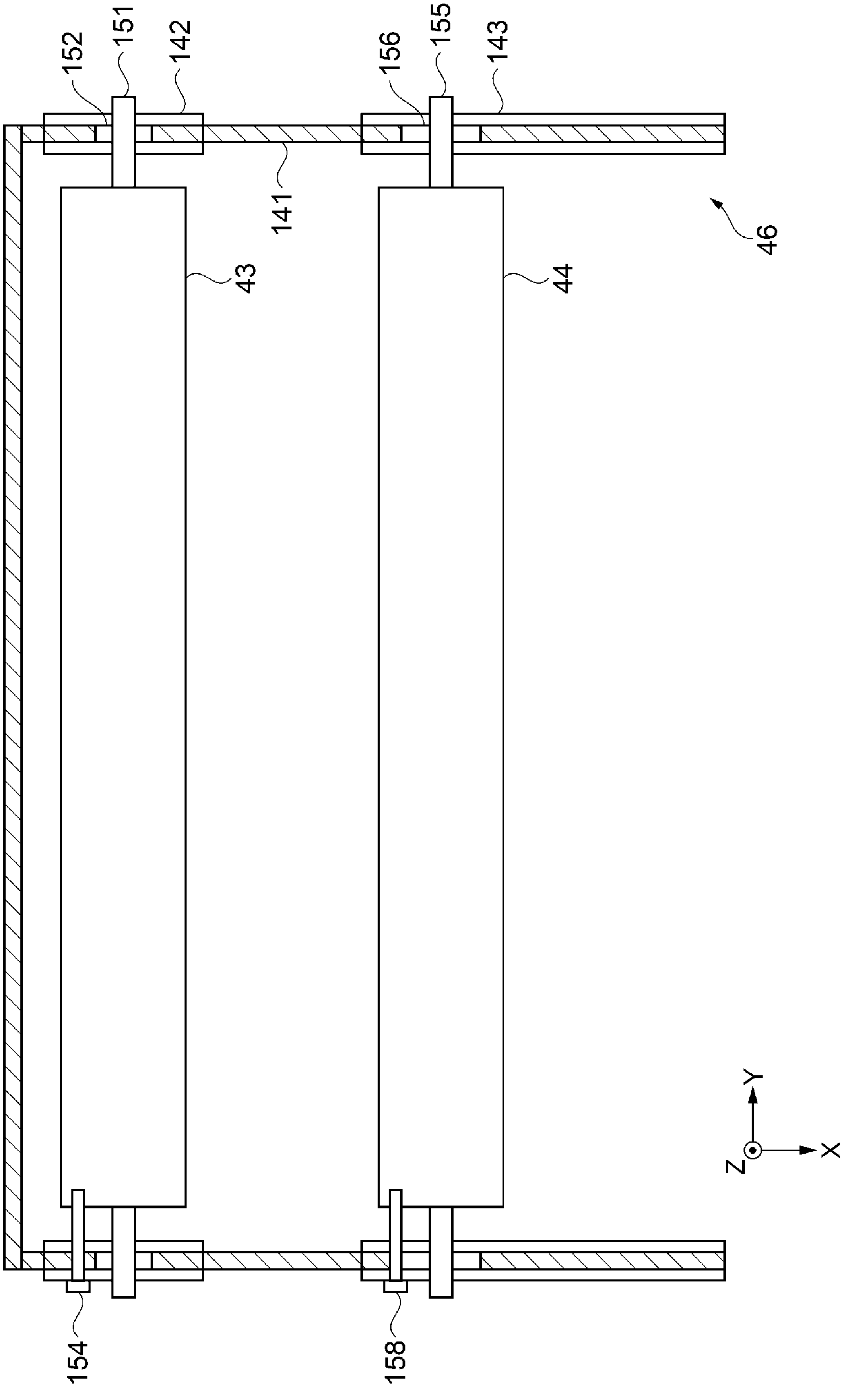
FIG. 6 is a diagram showing cross-sectional configuration of the first tension bar and the second tension bar.

FIG. 6 shows a cross-sectional configuration of the first tension bar 43 and the second tension bar 44 supported by the tension bar support member 46. The tension bar support member 46 of FIG. 6 includes the first rotation adjustment member 154 and the second rotation adjustment member 158. Although the tension bar support member 46 in FIG. 6 shows a state in which the first support frame 142 and the second support frame 143 are separated from each other, it is not limited to this configuration.

The first rotation adjustment member 154 disables rotation of the first tension bar 43. The first rotation adjustment member 154 is inserted through the first frame hole 153 shown in FIG. 3 provided in the first support frame 142 and through a through hole (not shown) provided in the guide member 141, into a first screw hole (not shown) provided in the first tension bar 43. The first rotation adjustment member 154 makes the first tension bar 43 non-rotatable when inserted into the first screw hole. The first rotation adjustment member 154 makes the first tension bar 43 non-rotatable, when the medium M is transported. When the user removes the first rotation adjustment member 154 from the first screw hole, the first tension bar 43 becomes rotatable. An example of the first rotation adjustment member 154 is a screw. The first rotation adjustment member 154 and the first screw hole correspond to an example of a first adjustment mechanism. In other words, when a first state is a state in which the first tension bar 43 rotates while the medium M is being transported and a second state is a state in which the rotation of the first tension bar 43 is more restricted than the first state, the printer 10 comprises the first rotation adjustment member 154 and the first screw hole as the first adjustment mechanism for switching the state of the first tension bar 43 between the first state and the second state. Note that, the first adjustment mechanism may be configuration including at least one of a brake member or a torque limiter for restricting the rotation of the first tension bar 43.

The second rotation adjustment member 158 disables rotation of the second tension bar 44. The second rotation adjustment member 158 is inserted through the second frame hole 157 shown in FIG. 3 provided in the second support frame 143 and a through hole (not shown) provided in the guide member 141, into a second screw hole (not shown) provided in the second tension bar 44. When the second rotation adjustment member 158 is inserted into the second screw hole, the second tension bar 44 is made non-rotatable. The second rotation adjustment member 158 makes the second tension bar 44 non-rotatable, when the medium M is transported. When the user removes the second rotation adjustment member 158 from the second screw hole, the second tension bar 44 becomes rotatable. An example of the second rotation adjustment member 158 is a screw. The second rotation adjustment member 158 and the second screw hole correspond to an example of a second adjustment mechanism. In other words, when a third state is a state in which the second tension bar 44 rotates while the medium M is being transported and a fourth state is a state in which the rotation of the second tension bar 44 is more restricted than the third state, the printer 10 comprises the second rotation adjustment member 158 and the second screw hole as the second adjustment mechanism for switching the state of the second tension bar 44 between the third state and the fourth state. Note that, the second adjustment mechanism may be configuration including at least one of the brake member or the torque limiter for restricting the rotation of the second tension bar 44.

The first rotation adjustment member 154 and the second rotation adjustment member 158 can be attached to and detached from the tension bar support member 46. The user can reduce the tension applied to the medium M by making the first tension bar 43 and the second tension bar 44 rotatable. The user can increase the tension applied to the medium M by making the first tension bar 43 and the second tension bar 44 non-rotatable. The user can adjust the tension applied to the medium M by making one of the first tension bar 43 or the second tension bar 44 rotatable.

As shown in FIGS. 5 and 6, the first tension bar 43 is rotatable, and the second tension bar 44 is rotatable. The printer 10 includes a first adjustment mechanism that enables or disables rotation of the first tension bar 43 while the medium M is being transported, and a second adjustment mechanism that enables or disables rotation of the second tension bar 44 while the medium M is being transported.

It is possible to individually adjust the slidability of the medium M with respect to the first tension bar 43 and the slidability of the medium M with respect to the second tension bar 44, which facilitates adjustment of tension on or transportability of the medium M.

The first adjustment mechanism and the second adjustment mechanism are not limited to the configuration shown in FIG. 6. The first adjustment mechanism may be any configuration capable of adjusting the rotation of the first tension bar 43. The second adjustment mechanism may be any configuration capable of adjusting the rotation of the second tension bar 44. As an example, the first adjustment mechanism may be configured by a brake member that applies a braking force by pressing the first tension bar shaft 151 and a drive mechanism that moves the brake member into contact with and away from the first tension bar shaft 151. The second adjustment mechanism may include a brake member that presses the second tension bar shaft 155 to apply a braking force, and a drive mechanism that moves the brake member into contact with and away from the second tension bar shaft 155.

Figure 7:
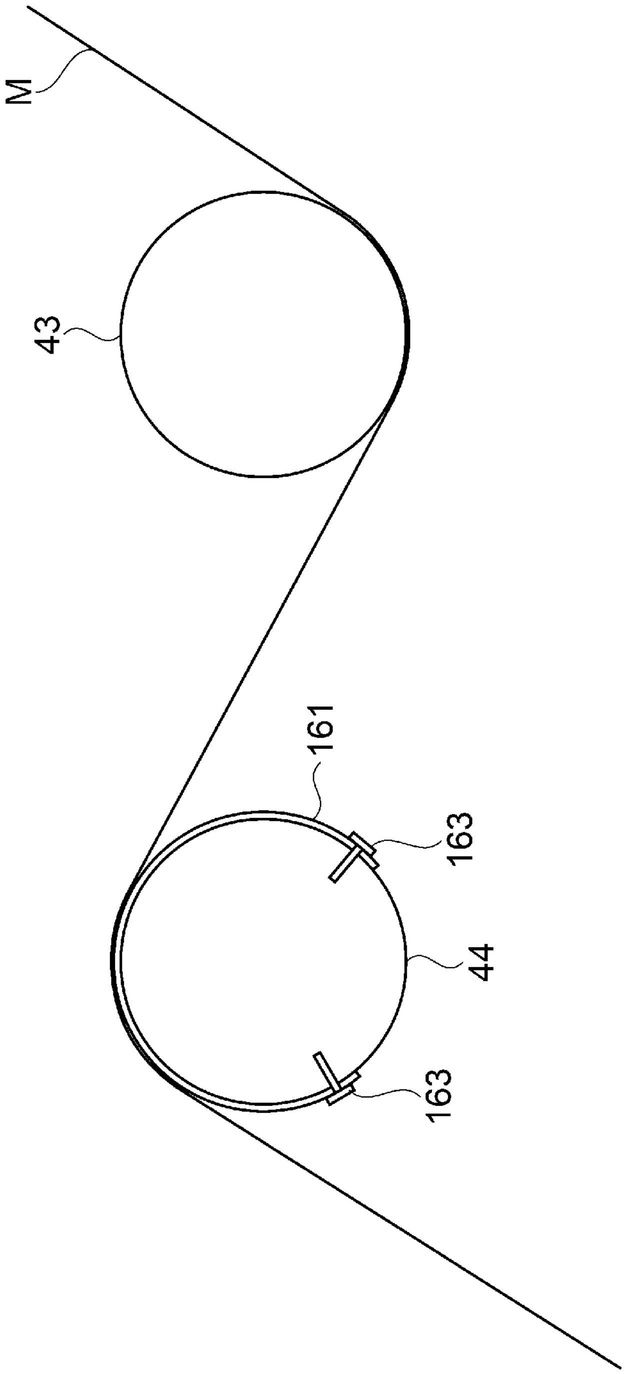
FIG. 7 is a diagram showing configuration in which a cover member is provided on the second tension bar.
Figure 8:
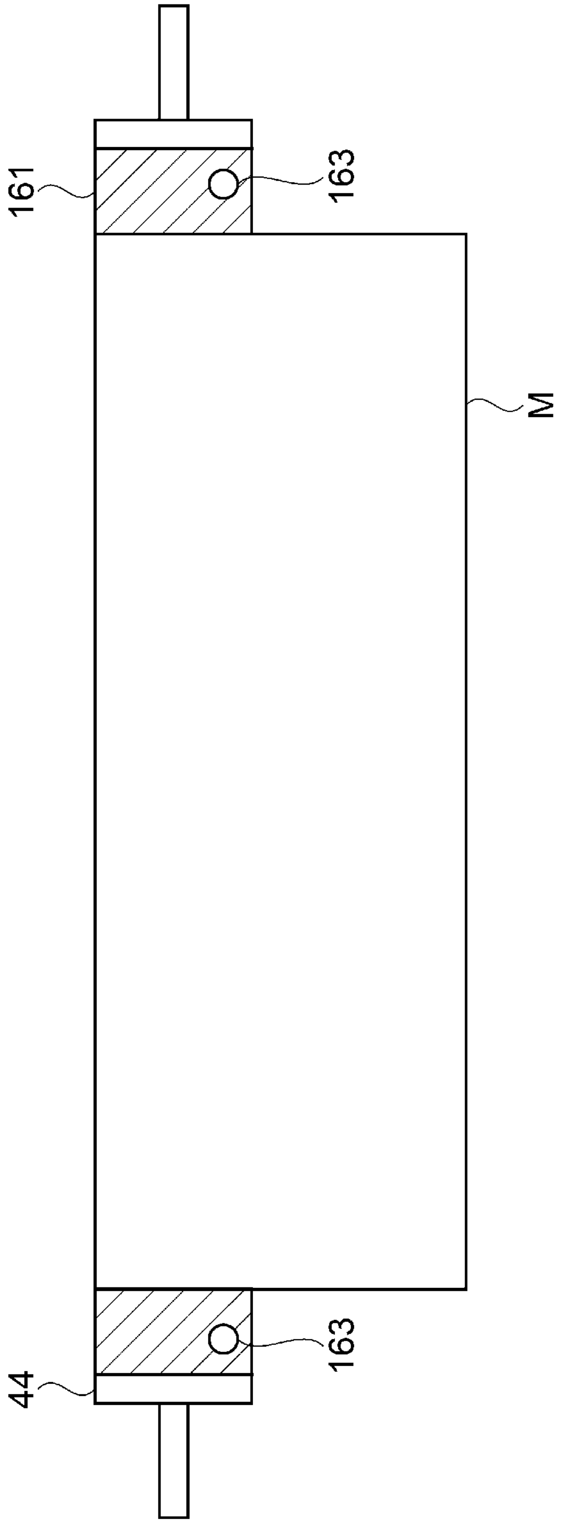
FIG. 8 is a diagram showing configuration in which the cover member is provided on the second tension bar.

FIGS. 7 and 8 show configuration in which the cover member 161 is provided on the second tension bar 44. FIG. 7 is a view of the second tension bar 44 viewed from the axial direction. FIG. 8 is a view of the second tension bar 44 seen from a direction perpendicular to the axis. The second tension bar 44 of FIG. 8 shows the medium M wrapped around it.

The cover member 161 is wrapped around the second tension bar 44. The cover member 161 is fixed to the surface of the second tension bar 44 by cover fixing members 163. As the cover member 161, a rubber member made of, for example, silicon resin is used. The rubber member has a higher coefficient of friction than the metal material used for the first tension bar 43 and the second tension bar 44. The frictional resistance of the surface of the rubber member is higher than the frictional resistance of the surface of the first tension bar 43 and the frictional resistance of the surface of the second tension bar 44. By using the cover member 161, the user can reduce slidability against the medium M and reduce fluctuations in tension of the medium M. The material of the cover member 161 is not limited to a rubber member. The cover member 161 may be made of any material as long as it has a frictional resistance higher than the surface frictional resistance of the second tension bar 44. The cover member 161 corresponds to an example of a friction member.

The width of the cover member 161 in the axial direction is wider than the width of the medium M in the axial direction. Since the width of the cover member 161 is wider than the width of the medium M, it is possible to prevent the medium M from directly contacting the second tension bar 44. As shown in FIG. 8, the cover fixing members 163 fix the cover member 161 at positions outside of the transport region of the medium M. Since the cover fixing members 163 are positioned to the outside of the transport region of the medium M, it is possible to prevent interference with the medium M.

In FIGS. 7 and 8, the cover member 161 is fixed to the second tension bar 44, but it is not limited to this. The cover member 161 may be provided on the first tension bar 43. The cover member 161 may be provided on the first tension bar 43 and the second tension bar 44.

The cover member 161, which has a surface with a coefficient of friction higher than that of the surface of the first tension bar 43 and of the surface of the second tension bar 44, is attachable and detachable to at least one of the first tension bar 43 or the second tension bar 44.

The cover member 161 can be attached and detached by removing the cover fixing members 163. The user can set transport conditions desirable for transporting the medium M by attaching and detaching the cover member 161 according to the type of the medium M used in the printer 10.

In the printer 10, the cover member 161, which has a surface with a coefficient of friction higher than that of the surface of the first tension bar 43 and of the surface of the second tension bar 44, is attachable and detachable with respect to at least one of the first tension bar 43 or the second tension bar 44.

By attaching and detaching the cover member 161, the user can adjust the slidability of the medium M and can increase the degree of freedom of adjustment of the frictional force between at least one of the first tension bar 43 or the second tension bar 44 and the medium M.

What is claimed is:

1. A recording apparatus comprising:

a recording unit configured to record on a medium;

a transport unit configured to transport the medium;

a winding unit configured to rotate about a rotation axis and windup the medium transported by the transport unit; and a first bar member configured to be wrapped around by a first surface of the medium;

a second bar member disposed between the first bar member and the winding unit and configured to be wrapped around by a second surface of the medium; and an arm member swingable about a swing axis that coincides with the rotation axis, wherein the arm member supports the first bar member and the second bar member.

2. The recording apparatus according to claim 1, wherein:

the arm member has an interval adjustment mechanism for changing an interval between the first bar member and the second bar member.

3. The recording apparatus according to claim 1, wherein:

the first bar member is rotatable and the second bar member is rotatable, when a first state is a state in which the first bar rotates while the medium is transported and a second state is a state in which the rotation of the first bar is more restricted than the first state, and when a third state is a state in which the second bar rotates while the medium is transported and a fourth state is a state in which the rotation of the second bar is more restricted than the third state, the recording apparatus further comprising:

a first adjustment mechanism for switching the state of the first bar between the first state and the second state; and a second adjustment mechanism for switching the state of the second bar between the third state and the fourth state.

4. The recording apparatus according to claim 1, wherein the wherein:

at least one of the first bar member and the second bar member is attachable and detachable with a friction member that has a surface with a higher coefficient of friction than a surface of the first bar member and a surface of the second bar member.

5. A transport device comprising:

a transport unit configured to transport a medium;

a winding unit configured to rotate about a rotation axis and wind up the medium transported by the transport unit;

a first bar member configured to press a first surface of the medium;

a second bar member disposed between the first bar member and the winding unit and configured to be wrapped around by a second surface of the medium; and an arm member that supports the first bar member and the second bar member and that is swingable about a swing axis that coincides with the rotation axis, wherein the arm member supports the first bar member and the second bar member.

* * * * *